R. J. BLOUGH.
BELT TIGHTENER.
APPLICATION FILED OCT. 24, 1916.
1,220,065.
Patented Mar. 20, 1917.
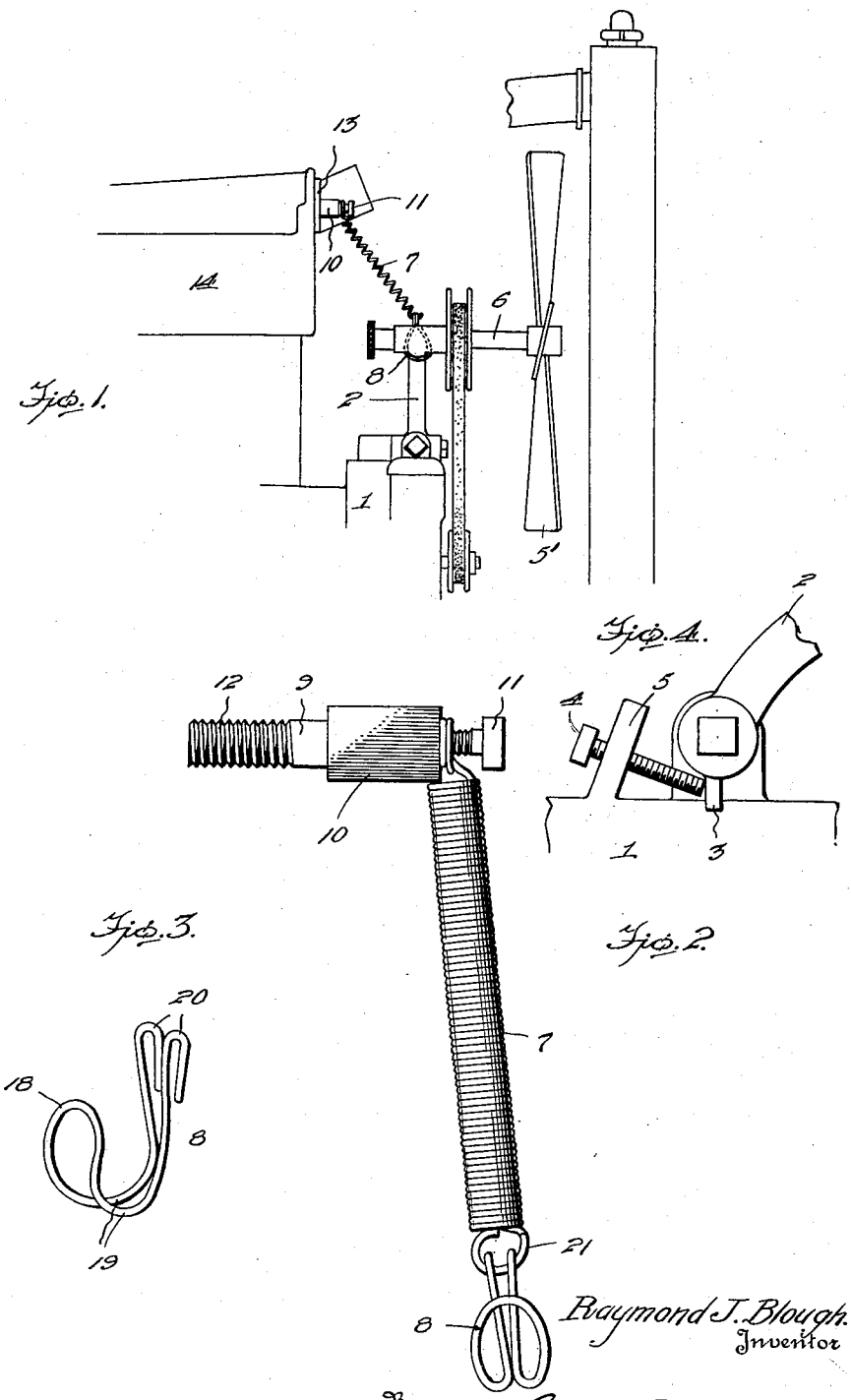

UNITED STATES PATENT OFFICE.

RAYMOND J. BLOUGH, OF IONIA, MICHIGAN.

BELT-TIGHTENER.

1,220,065.  Specification of Letters Patent.  Patented Mar. 20, 1917.

Application filed October 24, 1916. Serial No. 127,425.

*To all whom it may concern:*

Be it known that I, RAYMOND J. BLOUGH, a citizen of the United States, and resident of Ionia, in the county of Ionia and State of Michigan, have invented certain new and useful Improvements in Belt-Tighteners, of which the following is a specification.

The present invention relates to new and useful improvements in belt tighteners and has particular reference to means for detachably associating a belt tightener with a fan bracket of an automobile, in particular the type commonly known as a "Ford."

The primary object of my invention is to provide a belt tightener of the class described so constructed that the same may be detachably associated with the fan bracket of an automobile.

Another object of my invention is to provide a belt tightener of the class described which may be quickly and easily attached to an automobile and in particular the "Ford" type, without the necessity of drilling the cylinder head or marring the machine in any way.

Another object of my invention is to provide a detachable belt tightener of the class described which may be used in connection with the belt tightener now in common use on the type of machine known as the "Ford."

Other objects and advantages to be derived from the use of my improved detachable belt tightener will appear from the following detailed description and the claims, taken with an inspection of the accompanying drawings, in which:

Figure 1 is a fragmental side elevation of my device attached to an internal combustion engine of a form now in common use;

Fig. 2 is an enlarged side elevation embodying the improvements of my invention;

Fig. 3 is an enlarged detailed perspective view of the stirrup used in connection with my device; and Fig. 4 is an enlarged fragmental view of a portion of a belt tightener now in use.

Referring more particularly to the drawing, wherein similar characters of reference designate like and corresponding parts throughout the various views, I provide a crank case 1 having a fan bracket 2 pivotally connected thereto, the said bracket having a finger 3 formed thereon for engagement with a set screw 4 adjustably connected to bracket 5 from the crank case 1. The bracket 5 and set screw 4 are now in use to act as a belt tightener but are very unsatisfactory, in that the set screw 4 becomes loose and is often lost, which necessarily disables the operation of the fan 5' which is mounted on a counter-shaft 6 extending transversely of the fan bracket 2.

In order to avoid this I provide a tension spring 7 having a stirrup designated in its entirety 8 which will hereinafter be described in detail. The stirrup is adapted to straddle the fan bracket 2 and engage the side of the counter-shaft thus providing means to obtain a pull of the spring in a direct line with the fan bracket. The opposite end of the tension spring 7 is detachably connected to a bolt 9 having an enlarged head 10 by means of a set screw 11, which latter is adjustably connected to the end of the enlarged head 10. The bolt 9 also serves the dual purpose of a fastening means for one side of the top water connection with the radiator and a connector for the spring 7. The said bolt 9 is provided with a standard threaded portion 12 to be inserted in lieu of one of the water connection bolts, the water connection being designated 13. The said water connection is commonly attached to a cylinder head block 14 by means of a pair of bolts, not shown in the drawings.

The stirrup, designated 8 in its entirety, and best shown in Fig. 3 is composed of a wire strand being looped intermediate its ends as at 18, said wire strand being then bent to form a seat 19 to engage the fan bracket 2 at the jointure of the counter-shaft 6. The free ends of the wire strand are bent upon themselves as indicated at 20 to provide hooks for engaging a loop 21 of the tension spring 7.

In applying my device to an internal combustion engine and particularly to the type commonly known as the "Ford", to which it is particularly adapted, I remove one of the bolt connectors for the water connection to the radiator and insert my bolt 9 to which the tension spring 7 is detachably connected by means of a screw 11. The other end of the spring is attached to the fan bracket at the jointure of the counter-shaft by means of the stirrup, thus not only providing a belt tightener but also providing means for preventing the loss of the set screw 4 of the belt tightener now in use.

It is also to be noted that my device may be used separately, that is, without the use of the common form of belt tightener now in use, as it provides means for giving the spring tension to the countershaft which is a feature not provided by any of the belt tighteners now in use on internal combustion engines for automobiles but demanded by the very nature of its use.

From the above description taken in connection with the accompanying drawing, it is thought that a clear and comprehensive understanding of the construction, operation and advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:

1. In a belt tightener of the class described the combination of a rigid body member, a bracket pivotally connected to said body, a countershaft mounted transversely of said bracket, a belt member connecting said countershaft with a driving means on the said body, with a spring, a hook associated with one end of said spring adapted to engage the bracket and countershaft at their jointure, a bolt member engaging said body, and a screw providing means for detachably connecting the said spring with the bolt for a purpose specified.

2. In a belt tightener of the class described the combination of a rigid body member, a bracket pivotally connected to said body, a countershaft mounted transversely of said bracket, a belt member connecting said countershaft with a driving means on the said body, with a tension spring, a hook member connected to one end of said spring comprising, a wire strand, said wire strand being looped intermediate the ends thereof, the ends being bent to form a seat to engage the countershaft, the free end of said wire strand being bent to form small hook members to engage one end of the spring for a purpose specified.

In testimony whereof, I affix my signature hereto.

RAYMOND J. BLOUGH.